US012053717B2

(12) United States Patent
McGhee

(10) Patent No.: US 12,053,717 B2
(45) Date of Patent: Aug. 6, 2024

(54) SOLVENT EXTRACTION APPARATUSES AND METHODS

(71) Applicant: Gene Pool Technologies, Inc., Melbourne, FL (US)

(72) Inventor: David McGhee, Monument, CO (US)

(73) Assignee: Gene Pool Technologies, Inc., Cherry Hills Village, CO (US)

( * ) Notice: Subject to any disclaimer, the term of this patent is extended or adjusted under 35 U.S.C. 154(b) by 1054 days.

(21) Appl. No.: 15/929,263

(22) Filed: Apr. 20, 2020

(65) Prior Publication Data

US 2020/0246719 A1 Aug. 6, 2020

Related U.S. Application Data

(63) Continuation of application No. 15/666,396, filed on Aug. 1, 2017, now Pat. No. 10,835,838, which is a continuation of application No. 14/881,018, filed on Oct. 12, 2015, now Pat. No. 9,757,664, which is a continuation-in-part of application No. 12/802,424, filed on Jun. 7, 2010, now Pat. No. 9,604,155.

(60) Provisional application No. 61/217,911, filed on Jun. 5, 2009.

(51) Int. Cl.
*B01D 11/02* (2006.01)
*C11B 1/10* (2006.01)
*C11B 9/02* (2006.01)

(52) U.S. Cl.
CPC ...... *B01D 11/0207* (2013.01); *B01D 11/0219* (2013.01); *C11B 1/10* (2013.01); *C11B 1/102* (2013.01); *C11B 1/104* (2013.01); *C11B 1/108* (2013.01); *C11B 9/025* (2013.01)

(58) Field of Classification Search
CPC .................................................. B01D 11/0219
See application file for complete search history.

(56) References Cited

U.S. PATENT DOCUMENTS

| | | | |
|---|---|---|---|
| 1,679,728 A | 8/1928 | Lynn | |
| 1,802,533 A * | 4/1931 | Emmet | B01D 11/0203 202/168 |
| 2,254,245 A | 9/1941 | Rosenthal | |
| 2,375,142 A | 5/1945 | Sklar | |
| 2,548,434 A | 4/1951 | Leaders | |
| 3,936,489 A * | 2/1976 | Rozsa | B01D 11/0449 422/255 |
| 5,005,593 A | 4/1991 | Fagg | |
| 5,301,694 A | 4/1994 | Raymond | |
| 5,503,810 A | 4/1996 | Chang | |
| 5,516,923 A | 5/1996 | Hebert | |
| 5,525,746 A | 6/1996 | Franke | |

(Continued)

OTHER PUBLICATIONS

Tamisium Extractors Inc., TE3000 Channel Filter, https://web.archive.org/web/20140927011116/http:/www.tamisiumextractors.com/index.php/te-3000-1-kilo/channel-filter.

(Continued)

*Primary Examiner* — Donald R Spamer
(74) *Attorney, Agent, or Firm* — Daniel C. Pierron; Widerman Malek, PL

(57) ABSTRACT

The disclosed embodiments include systems and methods for the solvent extraction of a substance from a material. The disclosed systems include multiple tanks and an extraction chamber in communication with the tanks. Solvent transport is accomplished by heating and/or cooling selected tanks to cause the solvent to be transported between tanks.

33 Claims, 9 Drawing Sheets

(56) References Cited

U.S. PATENT DOCUMENTS

| | | | |
|---|---|---|---|
| 5,637,209 | A | 6/1997 | Wright |
| 5,998,640 | A | 12/1999 | Haefele |
| 6,312,528 | B1 | 11/2001 | Summerfield |
| 6,551,642 | B2 | 4/2003 | Trout |
| 6,860,998 | B1 | 3/2005 | Wilde |
| 7,002,029 | B2 | 2/2006 | Davis |
| 7,531,065 | B2 | 5/2009 | Yamamoto |
| 9,242,189 | B2 | 1/2016 | Buese |
| 9,272,230 | B2 | 3/2016 | Myers |
| 2003/0196282 | A1 | 10/2003 | Fyvie |
| 2004/0147769 | A1* | 7/2004 | Davis ............... B01D 11/0203 554/9 |
| 2006/0041154 | A1* | 2/2006 | Britt ............... C11B 1/10 554/8 |
| 2008/0128261 | A1* | 6/2008 | Balass ............... B01D 11/0219 202/176 |
| 2010/0130762 | A1 | 5/2010 | Hulse |
| 2013/0168225 | A1 | 7/2013 | Oikimus et al. |

OTHER PUBLICATIONS

Tamisium Extractors Inc., TE3000 Wafer Valve, https://web.archive.org/web/20140927011142/http:/www.tamisiumextractors.com/index.php/te-3000-1-kilo/wafer-valve.

Tamisium Extractors Inc., TE3000 Channel Filter, https://web.archive.org/web/20140927011112/http://www.tamisiumextractors.com/index.php/te-3000-1-kilo.

\* cited by examiner

| Polarity Index | Solvent | Solubility in Water (%) |
|---|---|---|
| 0 | N-Butane C4H10 | 0.0002 |
| 0 | Heptane | 0.0003 |
| 0 | Hexane | 0.001 |
| 0 | Pentane | 0.004 |
| 0.2 | Cyclohexane | 0.01 |
| 1 | Trichloroethylene | 0.11 |
| 1.6 | Carbon Tetrachloride | 0.08 |
| 2.2 | Di-Iso-Propyl Ether | 0 |
| 2.4 | Toluene | 0.051 |
| 2.5 | Methyl-t-Butyl Ether | 4.8 |
| 2.5 | Xylene | 0.018 |
| 2.7 | Benzene | 0.18 |
| 2.8 | DiEthyl Ether | 6.89 |
| 3.1 | Dichloromethane | 1.6 |
| 3.5 | 1,2-Dichloroethane | 0.81 |
| 3.9 | Butyl Acetate | 7.81 |
| 3.9 | Iso-Propanol | 100 |
| 4 | n-Butanol | 0.43 |
| 4 | Tetrahydrofuran | 100 |
| 4 | n-Propanol | 100 |
| 4.1 | Chloroform | 0.815 |
| 4.4 | Ethyl Acetate | 8.7 |
| 4.7 | 2-Butanone | 24 |
| 4.8 | Dioxane | 100 |
| 5.1 | Acetone | 100 |
| 5.1 | Methanol | 100 |
| 5.2 | Ethanol | 100 |
| 5.8 | Acetonitrile | 100 |
| 6.2 | Acetic Acid | 100 |
| 6.4 | Dimethylformamide | 100 |
| 7.2 | Dimethyl Sulfoxide | 100 |
| 9 | Water | 100 |

Fig. 2

SOLVENT EXTRACTION APPARATUSES AND METHODS

CLAIM OF PRIORITY

This application is a continuation of and claims priority from U.S. patent application Ser. No. 15/666,396 filed on Aug. 1, 2017, titled SOLVENT EXTRACTION APPARATUS AND METHODS by McGhee, which is a continuation of U.S. patent application Ser. No. 14/881,018 filed on Oct. 12, 2015, now U.S. Pat. No. 9,757,664, titled EXTRACTION METHODS by McGhee, which is a continuation in part of and claims priority from U.S. patent application Ser. No. 12/802,424 filed on Jun. 7, 2010, now U.S. Pat. No. 9,604,155, titled PLANT OIL EXTRACTION to common inventor McGhee, which is related to and claims priority from U.S. Provisional Application No. 61/217,911 filed on Jun. 5, 2009, titled PLANT EXTRACTOR by McGhee. This application incorporates by reference U.S. application Ser. No. 15/666,396, U.S. application Ser. No. 14/881,018, U.S. application Ser. No. 12/802,424, and U.S. application Ser. No. 61/217,911 in their entireties, except to the extent disclosure therein is inconsistent with disclosure herein.

FIELD OF THE INVENTION

The present invention relates to the extraction of solutes from masses such as carbon material.

BACKGROUND

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Problem Statement is to be construed as prior art.

The processes and apparatuses utilized for solute extraction, such as the oil extracted from carbon material (such as plant material), require complex compressors, vacuums, energy, and time. Such extraction requires the close and careful monitoring of the liquid solvent contact time, temperatures and pressures in the extraction process. Failure to do so can result in poor quality oil, failed extractions, damaged equipment, or even cause an extracting machine (an "extractor") to explode. Accordingly, there is a need for systems, methods and apparatuses that simplify or otherwise improve extraction processes, methods, and systems.

BRIEF SUMMARY

Embodiments include systems for extracting compounds from a compound-bearing material and various arrangements of said systems. A system may include a first thermal element in thermal communication with one of the first tank and the second tank. The first thermal element may be arranged for at least one of heating and cooling of one of the first tank or the second tank. In some embodiments, the first thermal element is arranged to evaporate solvent from the second tank and thereby assist the solvent to be transported in a vapor phase from the second "separator" tank to the first "solvent source" tank.

Embodiments also include methods of extracting a compound from a material.

BRIEF DESCRIPTION OF THE DRAWINGS

Various aspects of the invention, as well as an embodiment, are better understood by reference to the following detailed description. To better understand the invention, the detailed description should be read in conjunction with the drawings and tables, in which:

FIG. 2 is a table of the polarity and solubility in fluid of several solvents.

DETAILED DESCRIPTION

Figure 1:
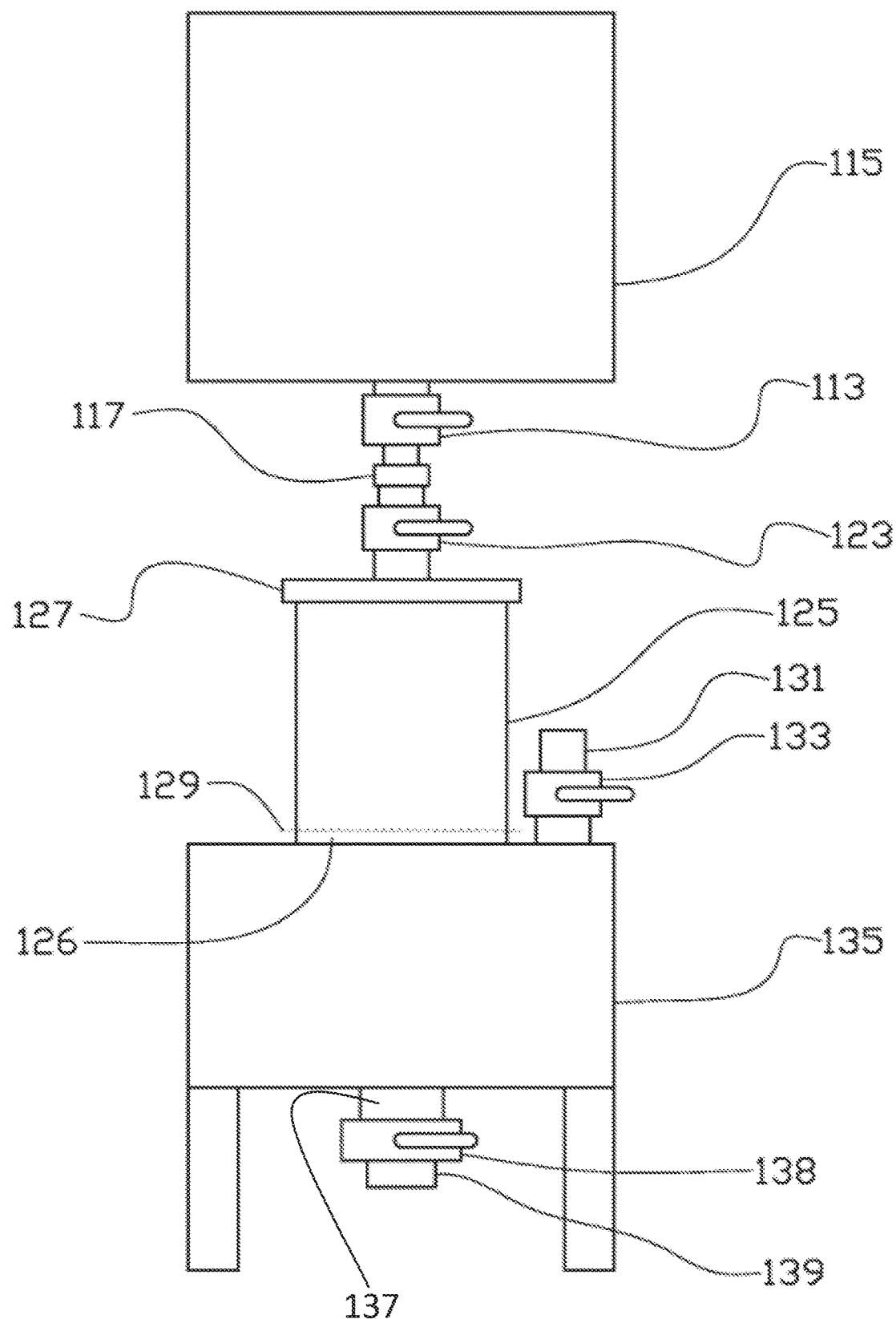
FIG. 1 shows a tabletop plant oil extractor.

When reading this section, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching").

Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in § 112, paragraph 6 of 35 U.S.C., unless used as "means for—functioning—" or "step for—functioning—" in the Claims section. Sixth, the invention is also described in view of the Festo and Alice decisions, and, in that regard, the claims and the invention incorporate equivalents known, unknown, foreseeable, and unforeseeable, and claims that articulate a method are to be provided structural significance, when reasonable. Seventh, the language and each word used in the invention should be given the ordinary interpretation of the language and the word, unless indicated otherwise. As will be understood by those of ordinary skill in the art, various structures and devices are depicted in block diagram form in order to avoid unnecessarily obscuring the invention.

Some methods of the invention may be practiced by placing the invention on a computer-readable medium, particularly the control and detection/feedback methodologies. Computer-readable mediums include passive data storage, such as a random access memory (RAM) as well as semi-permanent data storage such as flash memory. In addition, the invention may be embodied in the RAM of a computer and effectively transform a standard computer into a new specific computing machine, and may also animate actuators and other mechanical mechanisms to give life to largely otherwise inanimate machines. Data elements could include packets with additional headers/footers/flags. Data signals comprise data, and are carried across transmission mediums and store and transport various data structures, and, thus, may be used to operate the methods of the invention.

It should be noted in the following discussion that acts with like names are performed in like manners, unless otherwise stated. Of course, the foregoing discussions and definitions are provided for clarification purposes and are not limiting. Words and phrases are to be given their ordinary plain meaning unless indicated otherwise.

The present invention is a process for the extraction of solute from material, such as a carbon material, and the teachings of the present invention have particular applicability when extracting a plant oil from organic material, such as plant material. In one embodiment, the process according to the invention uses energy from a change of temperature to extract the plant oil from the organic material while recapturing a solvent that is used to "pull" the oil out of the organic material so that it may be reused. The process may remove as much as 98% or more of the plant oil contained in the organic matter (although yields as low as 93% may be acceptable in some extractions). The preferred process is self-contained, and in one embodiment needs only added heat or added cooling to create the change in temperature to operate more rapidly (or efficiently).

FIG. 1 shows a tabletop embodiment of a plant oil extractor according to the teachings of the invention. FIG. 1 comprises a first tank 115 which is constructed of stainless steel, and which is connected to and in fluid communication with a first valve 113. In turn, the first valve 113 is connected to and in fluid communication with a second valve 123 via a quick disconnect fluid coupling 117.

The second valve 123 is connected to and fluidly coupled to a cap 127 of a chamber 125 (preferably called a "column 125"), both of which are preferably made from stainless steel. The cap 127 is preferably removable and attachable to the chamber 125 via matching threaded ends—specifically, the cap 127 can be removed to allow for the placement of organic matter in the column 125.

The column 125 is also known as an "extraction column", and serves as a Buchner funnel that holds in its base 126 a filter 129 of various micron size; accordingly, the filter 129 may serve as a fluid resistor that can hold liquid in the extraction column which may eliminate the need for a valve to retard or stop output flow. Other implications of the Buchner funnel are readily apparent to those of ordinary skill in the art upon reading the present disclosure. Additionally, a heating or cooling jacket (not shown) is often utilized about the chamber 125 in order to facilitate the extraction and/or recovery processes.

The extraction process is achieved by a solvent migrating from the first tank 115 through the column 125 where it contacts and reacts with any matter, including organic matter, in the column 125; then, the solvent-extracted substance flows into Extractor/Evaporator tank 135. The solvent attaches to, dissolves, or otherwise carries-out substance(s) from the material(s) in the column 125. For example, this process may be used to remove plant oil from organic matter, whereby the solvent carries the plant oil through the column 125 and into the Extractor/Evaporator tank 135.

The relationship between the first tank 115 and the column 125 influences the efficiency of the process. The volume of the first tank 115 is preferably at least four times the volume of the column 125, and preferably four times the volume of the chamber 125, and optionally a +20% volume buffer zone to accommodate liquid expansion. At these volumes of the column 125, the process creates appropriate pressures in the extraction zone 120. Stated another way, the present invention uses a loading ratio, and the use of a loading ratio allows the user to send the correct amount of solvent through at one time, as fast as desired, without waiting on recovery for each loop as required by the prior art. Thus, it is seen that the invention separates the extraction process parameter control from the recovery process, allowing control of extraction speed, contact time, temperature, and polarity. Although a larger ratio may be used to perform the process, such embodiments may require additional tools and take additional time to process material with no apparent gain in yield.

The column 125 preferably includes the filter 129 at the base 126 to keep the organic matter in the tank, while allowing oil and/or solvent to drip or otherwise migrate through the filter 129 and into the Extractor/Evaporator tank 135. In one embodiment, the column 125 is connected to and fluidly coupled to the Extractor/Evaporator tank 135 via a bolt and flange, or a threaded connection, for example. When incorporating a bolt-and-flange type connection, the filter 129 may be further complimented with a combination wafer valve and channel filter that is "sandwiched" between two flanges. This allows the column 125 to be disconnected and for processed material in the column 125 to be replaced with fresh material safely without exposing volatile vapors in the Extractor/Evaporator tank 135 to atmosphere. The Extractor/Evaporator tank 135 comprises a third valve 133, a second safety quick disconnect coupling 131, a collection column 137 connected to a fourth valve 138, and a drainage pipe 139. These can be omitted from the smaller systems where volumes of vapors are not large enough to be a safety concern. Larger systems that pose a risk of exposing vapors to the atmosphere would best be suited for draining to access the extracted compounds via the connections listed.

Some solvents, such as butane, boil off at a lower temperature than the compound(s) dissolved and carried out. Accordingly, this allows the solvent to boil off and be collected and condensed in a recovery tank, thus leaving the other compounds behind. A user may then articulate the fourth valve 138 so that the compound(s) left behind can be drained through the drainage pipe 139, where it can be collected via a pan, hose, bowl, bottle, or other collection means. In practice, 5-10% of the butane is not recovered to allow the extracted solution to stay less viscous so it can easily flow out of the Extractor/Evaporator tank 135 into a smaller safer evaporator tank called a sucker tank. This "excess butane" may also be boiled away to a same or like butane recovery tank.

In one embodiment, the oil is forced through the fourth valve 138, assisted by a pressure induced upon the solvent. Ideally, any solvent that escapes with the oil evaporates at room temperature. After the oil has been completely removed, the fourth valve 138 is closed (typically, a user sees the solvent escaping, and by this knows that the oil has been removed). Preferably, the Extractor/Evaporator tank 135 has height to width ratio of 1:2 or 1:3, to allow maximization of the evaporation of the solvent for removal purposes, and may have a substantially flat bottom portion (however, an extractor tank may have a slight funnel or dish to pool extract into a drain output). Valves include ball valves, and non-ball valve devices such as choke valves, butterfly valves, needle valves, and globe valves, for example.

Alternative solvent recapture methods may be used. For example, in another methodology, after the extraction process is completed and the oil removed, the first valve 113, the second valve 123, the fourth valve 138 are all closed. The first tank 115 and the first valve 113 are disconnected via the safety quick disconnect 117 from the second valve 123. Then a hose (not shown but understood by those in the art) is connected to the first safety disconnect 117 and the second safety disconnect 131. When the hose has connected the first tank 115 to the Extractor/Evaporator tank 135, the first ball valve 113 and the third ball valve 133 are both opened. This recapture process allows the solvent to transport from the Extractor/Evaporator tank 135 and into the first tank 115 without traveling up through the column 125 (and, quite likely, the extracted organic matter it may contain). Once the solvent has been completely distilled into the first tank 115, the first and third valves 113, 133, are closed, and the hose disconnected. At this point, there should be no more pressurized air inside of the Extractor/Evaporator tank 135 and column 125. During recovery, tank 115 can be removed inverted and placed beside the tank 125 and the Extractor/Evaporator tank 135.

The solvent can be any of a number of chemical solvents (or mixtures)—such as polar, non-polar, to extract compounds of any polarity. For example, a solvent could be selected to match the polarity of the material being extracted, such as an oil in an organic material as is understood by those of skill in the plant oil extraction arts or co solvents can be mixed with butane in which butane becomes a carriers solvent for that added solvent. The most common used solvents are N-Butane (Butane), and Isobutane. Butane is sometimes referred to as a "primary solvent" or "carrier solvent" and self-generates the pressure needed to perform the extraction, which means that it generates pressure needed to create the pressure to move the solvent to perform the extraction and at the same time allows distillation to recover the solvent (instead of an unsafe recovery pump process) due to the fact that butane condenses at practical easy to achieve temperature decrease. When in gaseous phase, Butane will transport to the coldest area where it can condense into a liquid (e.g., in a recovery and/or source tank such as tanks 115, 573, 575, 576, and 622, which may be both a source and recovery tank). In contrast to a primary solvent, a "secondary solvent" or "co-solvent" may be mixed with the primary solvent to more effectively extract materials. Exemplary secondary solvents that are sometimes used with Butane is ethanol and or acetone.

There are at least four ways to accomplish the transportation of Butane (as a liquid or as a vapor) through the invention. The first way is to reduce the pressure in the Extractor/Evaporator tank 135 by chilling the Extractor/Evaporator tank to a temperature below the temperature of the first tank 115. This chilled area creates a vacuum that pulls the solvent from the first tank 115 and through the column of plant material in the chamber 125 with great force and then into the Extractor/Evaporator tank 135. The second way is to heat the top, first tank 115 increasing pressure in the first tank 115 and forcing the solvent to move through the chamber 125 and organic matter and into the Extractor/Evaporator tank 135. In a third way, pressure can be added to the first tank 115 via a compressor (this performs similarly to heating of the first tank 115, which adds the pressure). The fourth way is to allow the solvent to flow into the organic matter and drip out the bottom of the chamber 125 and into the Extractor/Evaporator tank 135. The fifth way is to heat the top tank so that the solvent can be subfreezing (or allowed to be heated depending on if the user wants to send the solvent through cold or hot). Accordingly, a head pressure will be created either way and will push the subfreezing solvent out of the tank.

FIG. 2 is a table showing the Polarity values for each of the options for solvents, and their solubility in fluid (note that some organic compounds or volatile compounds are degraded with the heat from a soxhlet extractor or eliminated during the material preparation drying required with $CO_2$ extractors). As previously mentioned, Butane also can be mixed with other solvents to adapt the polarity needed to extract oils/compounds of any polarity from any medium at any temperature for any contact time as fast or slow as needed while the solvent is in liquid phase. Liquids are denser than vapor and can transfer and hold temperatures passing these BTUs into the plant matter faster to enact a more efficient dissolving effect. The use of properly volumized tanks built with proper load ratios in a specifically designed tank allows all these factors to be maximized while allowing distillation to be safely and effectively used to recover the solvent.

Figure 3:
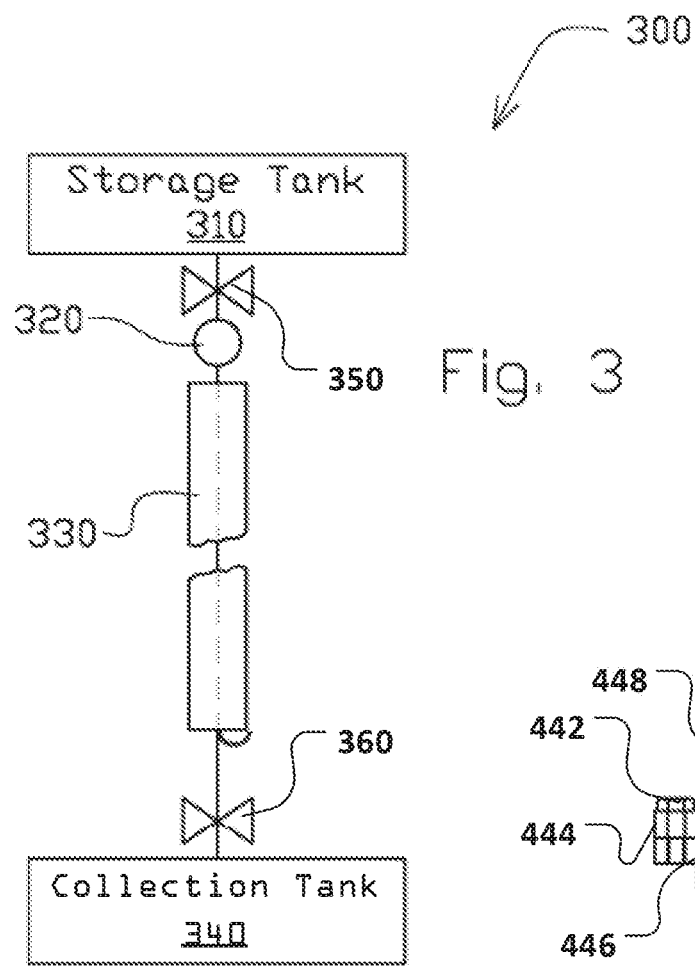
FIG. 3 shows an extractor column schematic.
Figure 4:
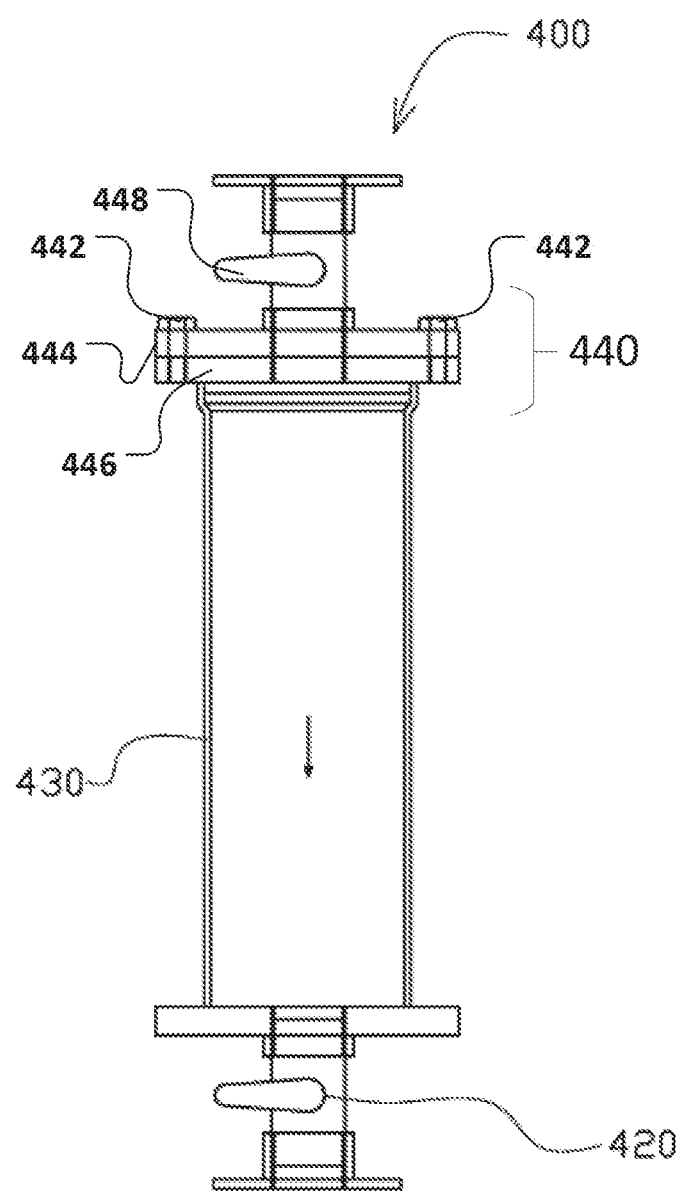
FIG. 4 shows an extractor column in some detail.

FIGS. 3 and 4 illustrate an extraction chamber schematic 300 and illustration of an extraction column system 400 to more clearly make apparent a feature of the invention. The extraction chamber schematic 300 illustrates a ball valve 320 fluidly coupled to solvent storage tank 310 and column 330, which is in turn fluidly coupled to collection tank 340 (e.g., an Extractor/Evaporator tank). Some embodiments employ a filter wafer valve (or "filter resistor"), as discussed in FIG. 1. Valves 350 and 360 may be gate valves.

The illustration of the extraction column system 400 provides another embodiment of a flow control between a column 430 and a recovery tank (not shown), implemented as a valve 420, such as a ball valve. System 400 further shows a bolt-and-flange coupling mechanism 440, with bolts 442 and flanges 444 and 446 although other couplings are possible, such as a threaded coupling mechanism (e.g., threaded ends). Flange coupling mechanisms may be utilized on one or both sides of column 430 and may be upstream and/or downstream of a valve, such as valves 448 and/or valve 420.

Figure 5:
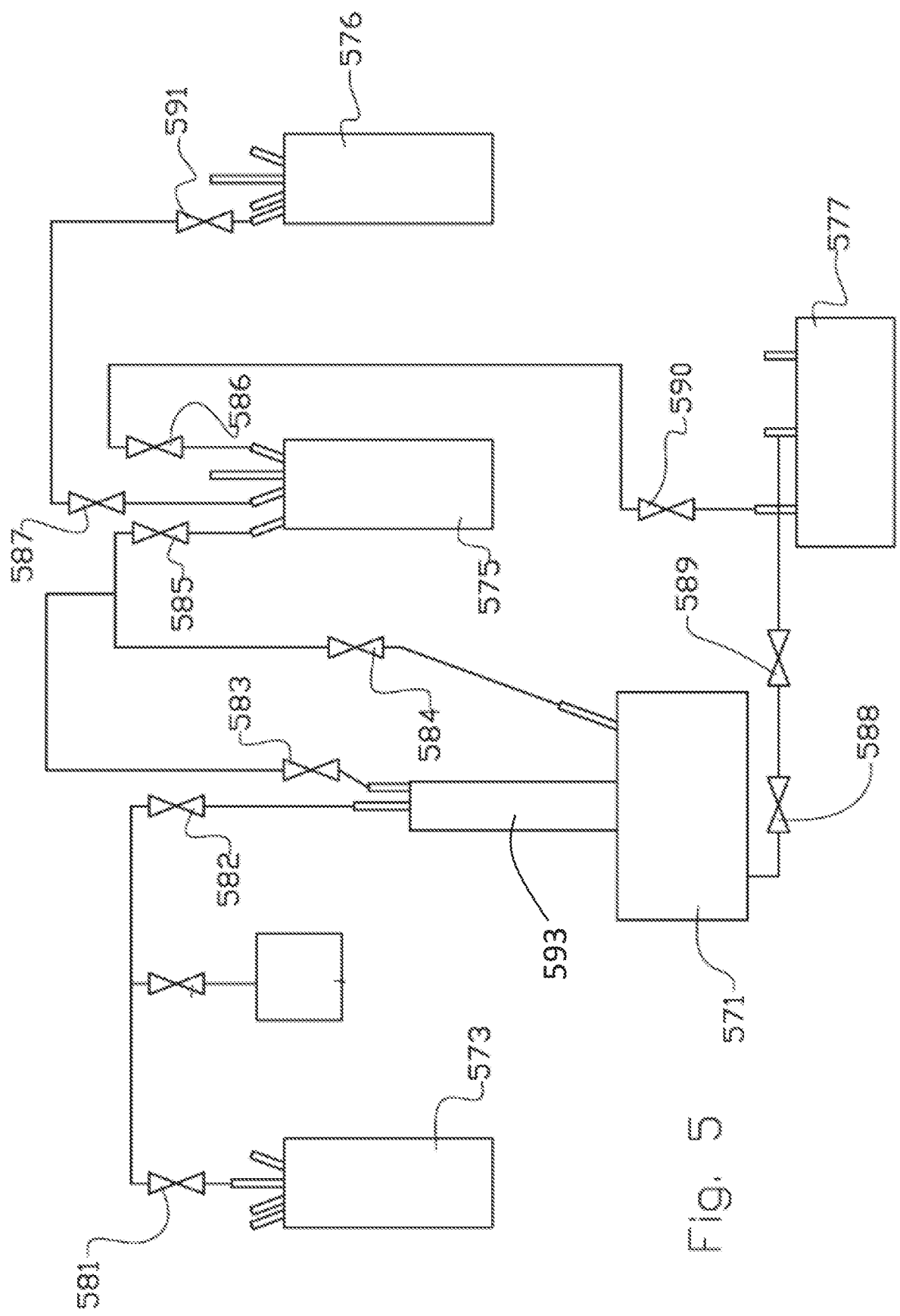
FIG. 5 illustrates a schematic of the automated system of the oil extractor.
Figure 6:
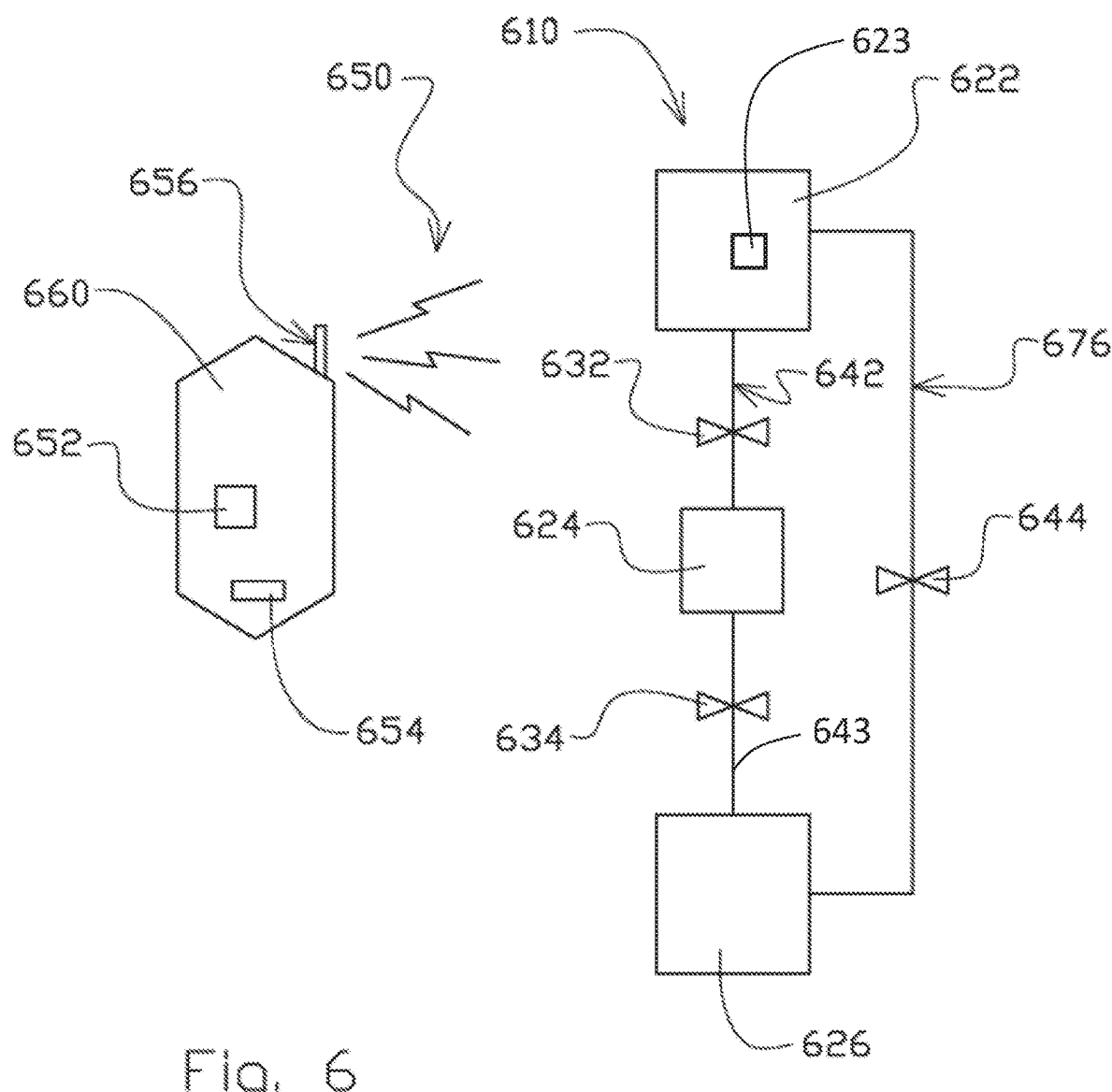
FIG. 6 illustrates an extraction automation system.
Figure 7:
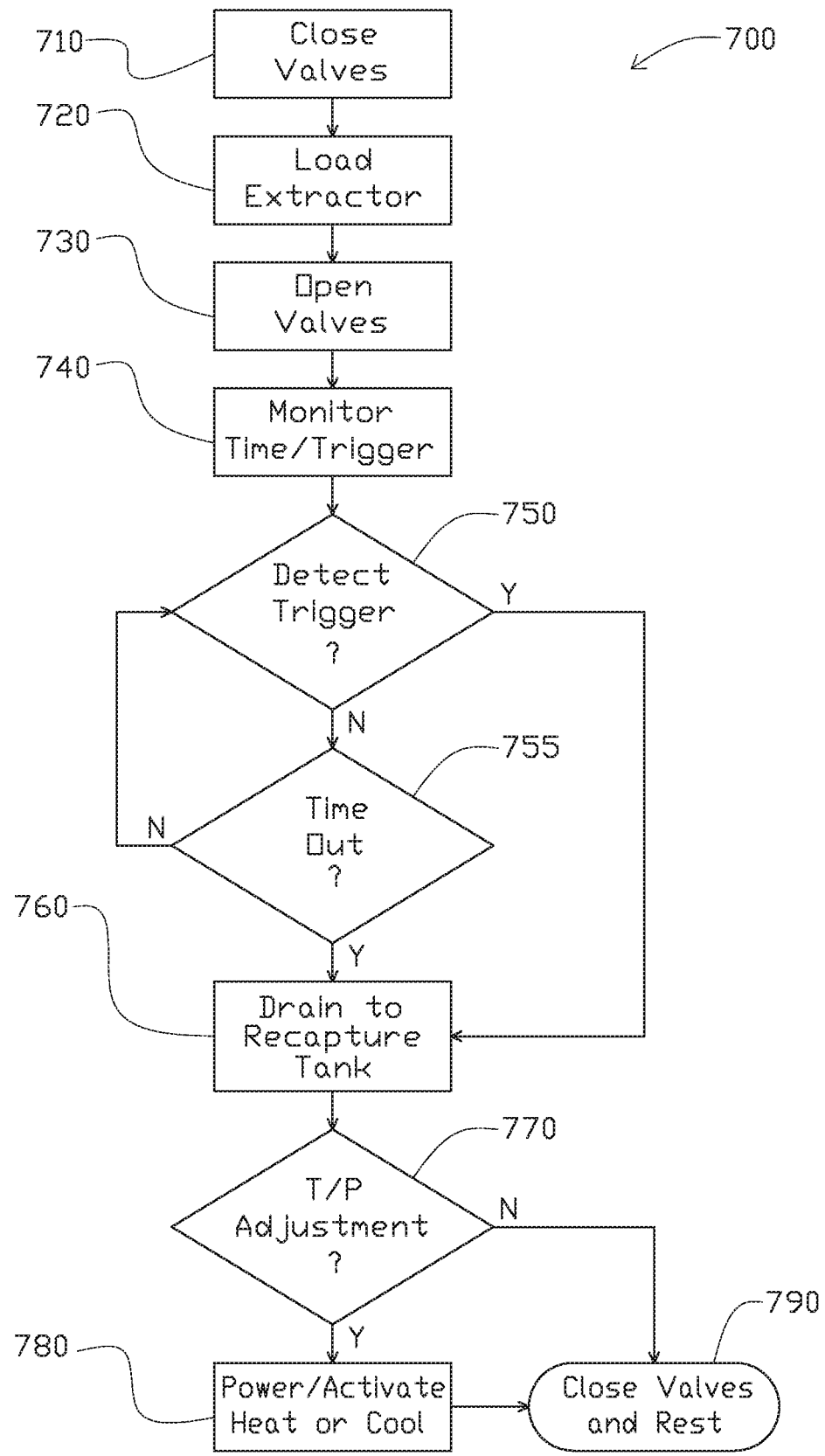
FIG. 7 is an extraction automation algorithm.
Figure 8:
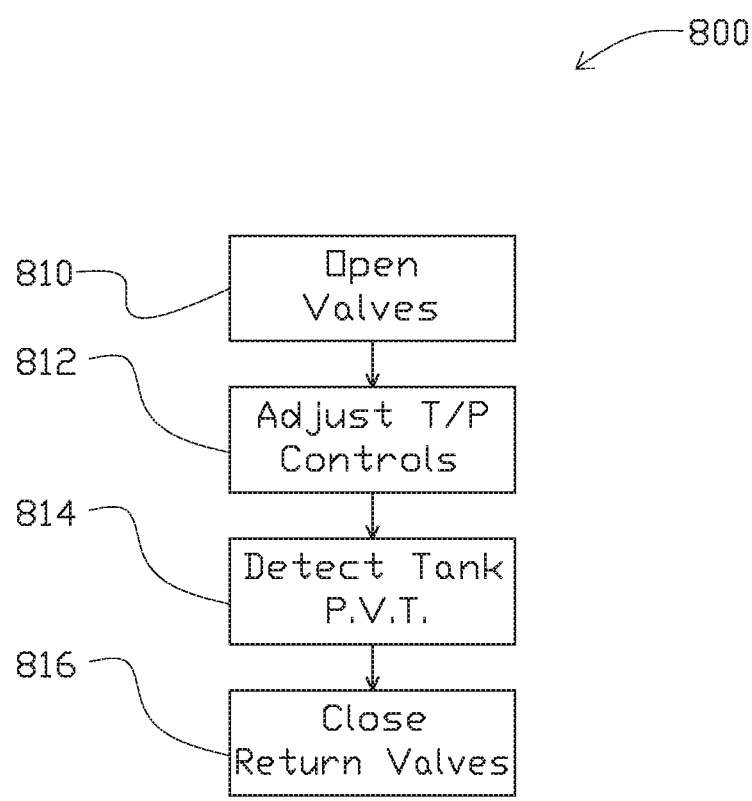
FIG. 8 is an extraction recapture automation algorithm.
Figure 9:
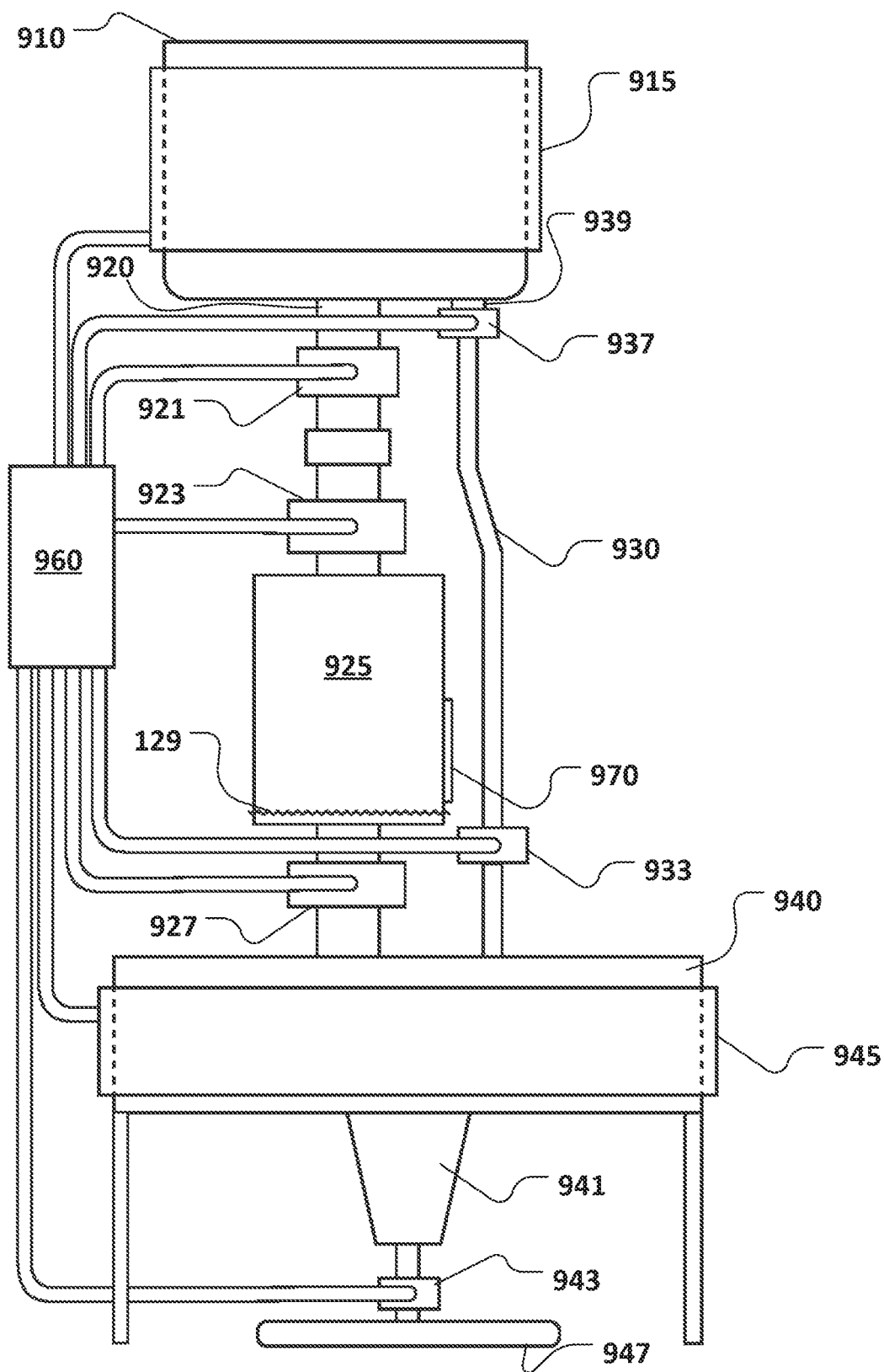
FIG. 9 shows an automated extraction system.

FIG. 5 is a schematic of an automated extractor system 500. The oil extraction process can be completely automated. The following discussion is made with simultaneous reference to FIGS. 5, 6, 7, and 8 in which FIG. 5 is an automated embodiment of the invention, FIG. 6 illustrates an extraction automation system, FIG. 7 is an extraction automation algorithm, and FIG. 8 is an extraction recapture automation algorithm.

Outline for Automating an Extraction Process

In an exemplary operation, a customer is given three settings that he or she can preprogram or pull from a batch file he saved from a previous run. Any changes to a previous run will have to be saved under a new file name. Preferably, these settings are Fill Speed, Contact Time, and Contact Temp. The user should be asked if he wants to input a solvent combination recipe before starting, or when saving his data before or after the run. The data entry inputs are as follows but may change to show analytical data later: 1) Operator Name, 2) Date, 3) Time, 4) Plant material—Common Name, Genus, Species, 5) Density of plant material, namely, weight of plant material occupying a column space/volume (for example, 1 kilo-3000 ml), 6) Solvent Recipe Solvent A (gr or ml) primary, Solvent B (optional secondary), 7) Automated data composed of the fill speed, contact time and contact temp.

This analytical data may operate the system, or used to create a system process (in the future). For example, rather than search for a batch file one may select a process that extracted the maximum amount of compound out. By way of another example, when the analyzer reports a increase in a target compound when heat is added, more heat may be added until that reported increase plateaus (accordingly, the system is a self-learning process).

When using solvents with butane, a prompt pops-up to remind the person filling the tank that the same amount of co-solvent added to butane requires that the same amount of butane be removed from the tank if already filled to maximum safe liquid capacity. For example, in one embodiment a solvent tank can only hold 12000 ml safely at room temp; so, a user cannot have 12000 ml or 7000 grams of butane in the solvent tank and add 20% more solvent of any kind (note that 7000 grams of butane=12000 ml at approximately room temperature, or 70 F). The system next reminds the operator that he or she must weigh his tank (or record an automatically generated weight) when filling (weight is the only accurate way to determine when a tank is safely full of a specific gravity solvent).

Extracting—Filling Column

Once the set temp is reached in the solvent delivery tank 573 the following valves open: 581 opens, 582 opens slowly if possible (and preferably over a period of five to ten seconds to prevent agitation of plant matter inside the column), and all of valves 584, 585, 587 and 591 can open to regulate fill speed of the extractor column 593. Next, the speed setting described below is monitored to activate the closing and opening of valve 584. During this stage of the process, the fill speed can be controlled by the user using a pressure differential fill speed setting, and the pressure differential should be between zero and twenty-five psi.

The purpose of opening valves 584, 585, 587 and 591 initially is to create a pressure differential using one or more of the cold solvent recovery tanks 575 and 576, which allows the solvent delivery tank 573 to fill the column 593 at varying speeds. Thus, a speed setting is controlled on the user side by setting a pressure differential between the solvent delivery tank 573 and the extractor tank 571. If the user is performing a Sub-Freezing, Room-Temp or Warm extraction this pressure differential will be varied. In other words, the user may not be able to get a twenty-five PSI differential with a sub-freezing setting—he may only be able to get a ten PSI differential.

When using two cold solvent recovery tanks 575, 576 to remove pressure, but where no pressure is created in the solvent delivery tank 573 because it is too cold, the user uses a heater on the solvent delivery tank 573 to create a head pressure in that tank. The pressure created before the solvent temperature starts to rise above the temperature setting dictates the maximum pressure differential set. Therefore, during a sub-freezing extraction, a warming heater on the solvent delivery tank 573 turns on to create the pressure during filling and emptying of the solvent from the solvent delivery tank 573, and the fill speed maximum setting is limited by the low temperature setting.

Once the liquid level in the solvent delivery tank 573 indicates the column 593 is filled, certain valves close for filling. After the column 593 is filled, as indicated by the liquid level sensor or weight of the solvent delivery tank 573, valves 584, 585, 587, 591 and 581 close at the same time (for optimal safety, however, during the filling of the column 593 only valve 584 needs to be closed to regulate fill speed). Next, five seconds later valve 582 closes. This five second delay is to allow liquid to drain from the line.

Next, a liquid level sensor in the solvent delivery tank 573 indicates a 20% drop in level, which implies that the column 593 is completely filled with solvent (if this is a weight, 20% still applies. Percentage applies to any size extractor operating under the strict volume ratios set forth in the design). This assumes that the solvent delivery tank 573 is filled to maximum safe capacity. A user may choose to partially fill his solvent delivery tank 573, but only if he also chooses to fill his column 593 partially. For example, a half full column 593 is mated with a half full tank, but a 20% extra still applies (in other words, the formula is relative to volumes). Accordingly, the user has an option to input that he or she only filled his column 593 halfway, and thus elects to use half the solvent (while still extracting out nearly 100% of available oil or other extracted material).

At this time the set points set by the user for soak time and temperature are applied to the solvent soaked into the plant material in the plant column. Next and at the same time the heat is turned on around the column 593 to match any set temp that the solvent delivery tank 573 was heated to, if any. The user may need to change the temperature sensor of the column 593 to a probe. In an alternative embodiment, a temperature sensor bolts straight on to the column 593 and allows a probe to insert a ways into the plant material.

If no heat is required, such as in a sub-freezing or cold extraction, no heat is delivered. If no soak time is required, the valve closing sequence above does not take place—in that case, solvent freely flows through the column until the solvent delivery tank 573 is empty.

Completing Extraction: Emptying/Washing the Column with Remaining Solvent

Next, valves 581, 582 and 584 open to complete the extraction process, while 585, 587, 591 remain open. Once the set time and temperature are achieved, the valves that control solvent delivery from the solvent delivery tank 573 open so that the rest of the solvent can pass through the column 593. At this point the solvent delivery tank 573 is empty, the extraction process is complete and ready for recovery. Preferably, a liquid level sensor in the solvent delivery tank 573 determines when the solvent delivery tank 573 is empty (a scale could be used as well). In operation, at this point a prompt pops up asking if it is ok to start the Recovery Process (additionally, a checkbox or other prompt selected at the beginning of the process can bypass this prompt).

Solvent Recovery

Solvent Recovery begins by opening valves 584, 585, 587, 591 (any of which may already be opened). Next, valve 583 opens 5 minutes later to allow some of the column liquid solvent to begin evaporating out of the top of the column as well as the bottom through valve 584. A 5-minute wait time is given to allow the column to drain, partially emptying it to prevent liquid from bypassing the column 593 and running directly into a recovery tank 575 or 576. Next, preferably a prompt pops up asking if the customer wants to manually close the wafer valve on the bottom of column 593 to prevent any solvent from draining out of the column. This is of particular importance to users who want to extract cold and fast. If they leave this drain open, the solvent in the column will be heated and may extract out compounds they are trying to avoid by using lower temps and lower contact times essentially tainting their purer extract in the extractor tank 571. Alternatively, a servo can be placed on this rotating gate valve to automatically close it, which is preferably activated checking a box at the beginning of the extraction process.

After the valves are opened, the column heater and extractor tank heater turn on and reach the preset temperatures for recovery. The system provides the user a temperature range to recover at, and has a default setting. Accordingly, a user can choose the preset temperature range of the extractor tank 571 and column 593 before starting the extraction process. That range is preferably 85 F-115 F on both the extractor tank 571 and the column 593; however, the preferred setting is 115 F (thus, the column 593 can finish evaporating solvent before the extractor tank 571 evaporates eliminating any chance of not recovering solvent insulated from heat by the plant material.). However, if a user is extracting at 80 F, for example, and sets the column 593 temperature at 115 F, there is a chance that some of the solvent draining out will be extracting compounds. Accordingly, in an exemplary method, a delay of 1-60 minutes transpires before heat is introduced to the column 593 (effectively holding it at the extraction temp until the delay expires). This extra time would allow the column 593 to drain more completely. Alternatively, a column drain valve may be closed. Using the proper load ratio and volume ratios is important to ensure the column 593 and extractor tank 571 finish evaporating all the solvent at the same time. Having less solvent in the extractor tank 571 may allow it to finish before the column solvent has completely been recovered because the solvent is absorbed into the plant matter. There is no other simple way to determine if the solvent is evaporated from the column otherwise.

Draining into the Sucker Tank

Next, valves 584, 585, 587, 591, and 583 are closed (this is initiated by a liquid level Sensor in the extractor tank 571). Once the level indicates that the remaining solvent level in the extractor tank 571 is between 0.5 inches to 1 inch from the bottom (or, in alternative embodiments 5-10% of the solvent remains in the extractor tank), the drain process is started. After the above valves are closed valves 588, and 589 open.

Once the pressure in the sucker/dryer tank 577 starts to equalize with the pressure in the extractor tank 571, valves 590 and 586 open to relieve the pressure to aid in draining any remaining solvent laden extract for the extractor tank 571. The valves stay open during the final phase of recovery from the sucker tank 577. Valve 588 preferably closes five minutes after the start of the draining process to ensure any pooled extract drains out of the extractor tank 571. Next, valve 589 closes, preferably thirty seconds later, which allows liquid to drain out of the line. Alternatively, in some embodiments it is advantageous to open valves 590 and 586 before valves 588 and 589 are opened. For example, if the liquid level sensor in the extractor tank 571 is erratic or inaccurate, opening valves 590 and 586 allows any over-fill to safely run over into the recovery tank 575 preventing a hazard from hydraulically filling the sucker/dryer tank 577. On the other hand, the extractor tank 571 valves would still be open except for the fact that we would be using time to close them and not a liquid level sensor.

A vent valve on the sucker tank 577 prevents pressure spikes, and is preferably set to open at 105 PSI or no more than 10% of its MAWP pressure. Alternatively, a high-pressure sensor may be provided on the sucker tank 577, which would prevent valve 588 and valve 589 from closing if the pressure starts to spike and/or could prompt valve 590 and valve 586 to open. To avoid pressure issues, it is preferable that the sucker tank 577 capacity is not exceeded during draining.

Alternatively, one may use a recovery tank 575 or 576 as a solvent delivery tank, thus bypassing the need to move the solvent into another tank before sending it through the column. This could work, for example, with Sub Freezing Extraction processes. In heated extractions it may not be as feasible.

Similarly, FIG. 6 illustrates an automated extraction system 610, which includes a control module 660. The automated extraction system comprises a first tank 622. The tank 622 is preferably ASME coded to 100 PSI MAWP with a 120 F max temp, and is typically specifically used with n-butane. Incorporated on the tank 622 is a Vented Relief Valve Inline or VRVI set to release pressure at 105 psi or no more than 10% of its MAWP pressure in the event it needs to. This pressure relief setting adheres to ASME standards for Vents, Seals, VRVI, Ball Valves and Safety QDs are all industry standard approved equipment rated for the temps, pressures and solvents being used and are removable for improvement replacement or repair. The tanks are designed to hold a specific volume of safe maximum liquid capacity with a head space of 20% that is calculated sufficient for expansion and contraction based on the coefficient of expansion for the butane solvent being used in the temperature range allowed. This also is the case with all the solvent delivery extractor tank 571 and recovery tanks 575 or 576 and sucker/dryer tank 577 of the present invention. The tank 622 is preferably coupled via high pressure lines that are all capable of holding hydraulic pressure in excess of MAWP pressures of the tanks (3000 psi plus on the lines).

The lines are PTFE rated for butane and other co-solvents that may be used in the temp and pressure ranges allowed (further, manufacturer approval has been obtained for even propane however the tanks are not rated for propane use). The tank 622 comprises a first sensor 623 set for monitoring tank factors, such as temperature, pressure and liquid volume (each monitored physical property may be monitored by a single sensor). The first tank 622 is fluidly coupled to a chamber 624 known sometimes as an "extraction column," which during processing holds the organic materials being processed, via a first extraction line 642. Between the first tank 622 and the chamber 624 is a first automated valve 632 that controls the flow through the first extraction line 642. A second automated valve 634 controls the flow through the second extraction line 643 which couples the chamber 624 to an extractor/evaporator tank 626. Likewise, a third automated valve 644 controls the flow through the recapture line 676 which couples the first (solvent) tank 622 to the extractor/evaporator tank 626.

The first automated valve 632, second automated valve 634 and third automated valve 644 are preferably ball valves, include an actuator that opens and closes the automated valves, and are adapted to via wire or wirelessly communicate with the control module 660. The first sensor 623, second sensor, and third sensor are preferably a wireless sensor, as described in more detail below. The use of sensors is known in the electro-mechanical arts, and the invention may incorporate any sensors known or foreseeable in the art.

The control module 660 communicates with and controls the processing of the automated extractor 610. The control module could be a dedicated processing system designed to control the automated extractor 610, a cell phone (articulated via a cell phone App), computer, or any other computing device that has processing and communication capabilities. Preferably, the control module 660 includes a processor such as a computer chip, digital signal processor (DSP), or a logic controller. Further, the control module 660 includes a memory 654, such as RAM, or flash memory, for example, as well as a wireless antenna 656 (which could be internal to the control module 660 device). The wireless antenna 656 is coupled to a communications chip (not shown, but understood in the wireless communications arts) that provides WiFi, Bluetooth, near field communication (NFC) or cell communication capabilities, for example. Accordingly, the control module 660 is enabled to communicate wirelessly with the wireless automated valves 632, 634, 636. Of course, the communications 650 may be achieved via wired lines as well.

FIG. 7 is an extraction automation algorithm 700, which may execute on a processor that is directly connected to an extraction system's actuators, or which may execute on a processor maintained in a control module, such as a cell phone or other mobile computing device. Preliminarily, there is a pressure check sequence required to check the system for leaks prior to filling with butane, which is preferably a "fill and wait for pressure drop" type test, and is preferably able to isolate the leak if one is detected in the first pressure check phase. Assuming that no leaks are detected, the extraction automation algorithm 700 begins with a close valves act 710 which closes selected valves in the automated extraction system 610. Preferably, in the automated extraction system 610, all of the valves 632, 634, and 636 are closed, but at least the first automated valve(s) 632 are closed. Then in the load extractor act 720 organic material is loaded into an extraction column.

In a preferred embodiment, an extraction chamber, such as the chamber 624, is loaded with a pre-measured and selected amount of selected material. Here, for example, the material is an organic material and can be directly loaded into the extraction chamber with an automated loading mechanism (not shown), or a "pod" of pre-measured organic material can be loaded into the extraction chamber via an automatic loader or manually. In a pod embodiment, each pod will be pierced prior to loading, or in an alternative embodiment a lid or other surface of the extraction chamber 624 is configured to pierce the pod in a manner that allows a solvent from a solvent tank, such as the first tank 622, to flow therethrough in an open valves act 730. In the open valves act 730 at least the first valves 632 are opened so that the solvent can flow into the extraction chamber, preferably through an extraction line 642, but alternatively the second automated valve(s) 634 are also opened so that solvent can also flow through the extraction line 643.

Next, in a monitor time/trigger act 740 a number of factors can be monitored for a change or indication that the organic material is processing or has been processed. Monitored factors include temperature, pressure, fluid and/or gas volume(s), spectrum analysis, organic molecule density, or the like, and are monitored via sensors such as first sensor 623, second sensor, or third sensor, for example. In a detect trigger query 750, when a predetermined factor measurement is discovered, or a predetermined factor change is detected in a monitored factor, then the extraction automation algorithm 700 proceeds along the "Y" path to a drain recapture act 760. As the extraction automation algorithm 700 monitors factors, it periodically checks how long the monitoring has been going on in a time out query 755. If a trigger fails to activate in the detect trigger query 750 in a predetermined amount of time "T" (such as 30 minutes), then the time out query 755 proceeds along the "Y" path to the drain to recapture tank act 760. In the drain to recapture tank act 760 the second automated valve(s) is opened so that solvent can flow into the recapture tank 626.

In a T/P Adjustment query 770, the extraction automation algorithm 700 may adjust a temperature or a pressure in a tank (if no adjustment is made, then the algorithm 700 proceeds along the "N" path to a close valve(s) and rest act 790). Accordingly, when a temperature or pressure adjustment is made, the algorithm 700 proceeds along the "Y" path to a Power/Activate Heat or Cool act 780 which directs heat jackets to raise a temperature of a chamber, a cooling jacket to lower the temperature of a chamber, or other systems to adjust their temperature or pressure. Then, following the appropriate adjustments, the algorithm proceeds to the Close Valve(s) and Rest act 790, in which the valves close and the extraction system rests.

FIG. 8 is an extraction recapture automation algorithm 800, which begins with an open valves act 810 in which valves that couple a recapture tank to a solvent storage tank, such as the 3rd automated valve(s), are opened. Next, in an adjust T/P Controls act 812 the algorithm 800 directs the heat jackets to raise a temperature of a chamber, a cooling jacket to lower the temperature of a chamber, or other systems to adjust their temperature or pressure to motivate a solvent flow from the recapture tank to the storage tank. Next, in a Detect Tank PVT act 814, sensors such as the first tank sensor 623 and a recapture tank sensor such as the third sensor detect temperature, pressure, molecular concentrations, and/or volumes and communicate these factor(s) to a processor, such as the processor 652, which may then direct jackets or other means to raise or lower the temperature or pressure of either tank to motivate the solvent from a recapture tank to a storage tank such as the first tank. Then, following the appropriate adjustments, the algorithm 800 proceeds to the Close Return Valve(s) act 816, in which the valves close and the extraction system rests.

The oil extraction process can be completely automated. FIG. 900 is an automated embodiment of the invention having a storage tank 910, an extraction line 920, a recapture line 930, a heating/cooling jacket for first tank 915, a first ball valve 921 exiting the first tank 910 connected to a second ball valve 922, connected to the chamber 925 connected to a third ball valve connected to a recapture tank 940 which has a heating/cooling jacket 945, an oil drainage trough 941 connected to a fourth ball valve 943 which when open drains into an oil collection reservoir 947. The recapture tank 940 is coupled to a fifth ball valve 933 via the recapture line 930, and is connected via a sixth ball valve 937 connected to the first tank 910. All of the ball valves 921, 923, 927, 933, 937, 943 are connected to computer control system, and are preferably electrically articulated, although other, non-ball valves that are electrically articulate may also be used. The cooling/heating jackets 915, 945 may be controlled by the computer system with electrical pumps that are arranged to transfer cool or warm fluids to the proper jacket based on the process being performed.

To begin an automated extraction process, a solvent is loaded into the storage tank 910, organic matter is load into the chamber 925, and all of the ball valves 921, 923, 927, 933, 937, 943 are closed. An automated control board 960 is controlled by a computer system, and operates to open the first ball valve 921 and the second ball valve 923 allowing the solvent to drain into the chamber 925 and soak into the organic matter. After either a predetermined amount of time, or when a "trigger condition" is sensed, the automated control board 960 opens the third ball valve 927 allowing the solvent and extracted oil to drain into the second tank 940. If additional temperature change is needed to force the solvent to transport, the automated control board 960 causes the first heating sleeve 915 to heat the first tank 910 and/or cause the chilling sleeve 945 to cool second tank 940. After either a predetermined amount of time had elapsed, or a "triggering condition" is sensed, the solvent and oil are determined to have transferred into the recapture tank 940. The automated control board 960 then closes the first, second, and third ball valves 921, 923, 933 and opens the fourth ball valve 943 to drain the oil out of the oil collection reservoir. The extraction process has now been completed, and the automated control board 960 closes the fourth ball valve.

The automated control board 960 starts the recapture process by opening the fifth and sixth ball valves 933, 937. The automated control board 960 starts the chilling jacket 915 on the first tank 910 and/or the heating jacket 945 on the second tank 940 creating a pressurized vacuum forcing the vapor-phase solvent to travel into the first tank 910, where the solvent condenses (i.e., turns into a liquid). Next, the automated control board 960 closes the fifth and sixth ball valves 933, 937. The solvent is now in the first tank 910. In order to eliminate condensed solvent from escaping into the recapture line, a check ball valve 939 is provided to allow the solvent to flow into the first tank 910, but also prevent the liquid solvent from leaking out and flowing down into the recapture tank 940. In this embodiment, an easy access cap 970 has been added to the chamber for easier replacement of the organic matter. The access cap 970 hermetically seals to the chamber 925, and withstands pressures as needed, which are determinable based on factors known to those of skill in the art.

Figure 10:
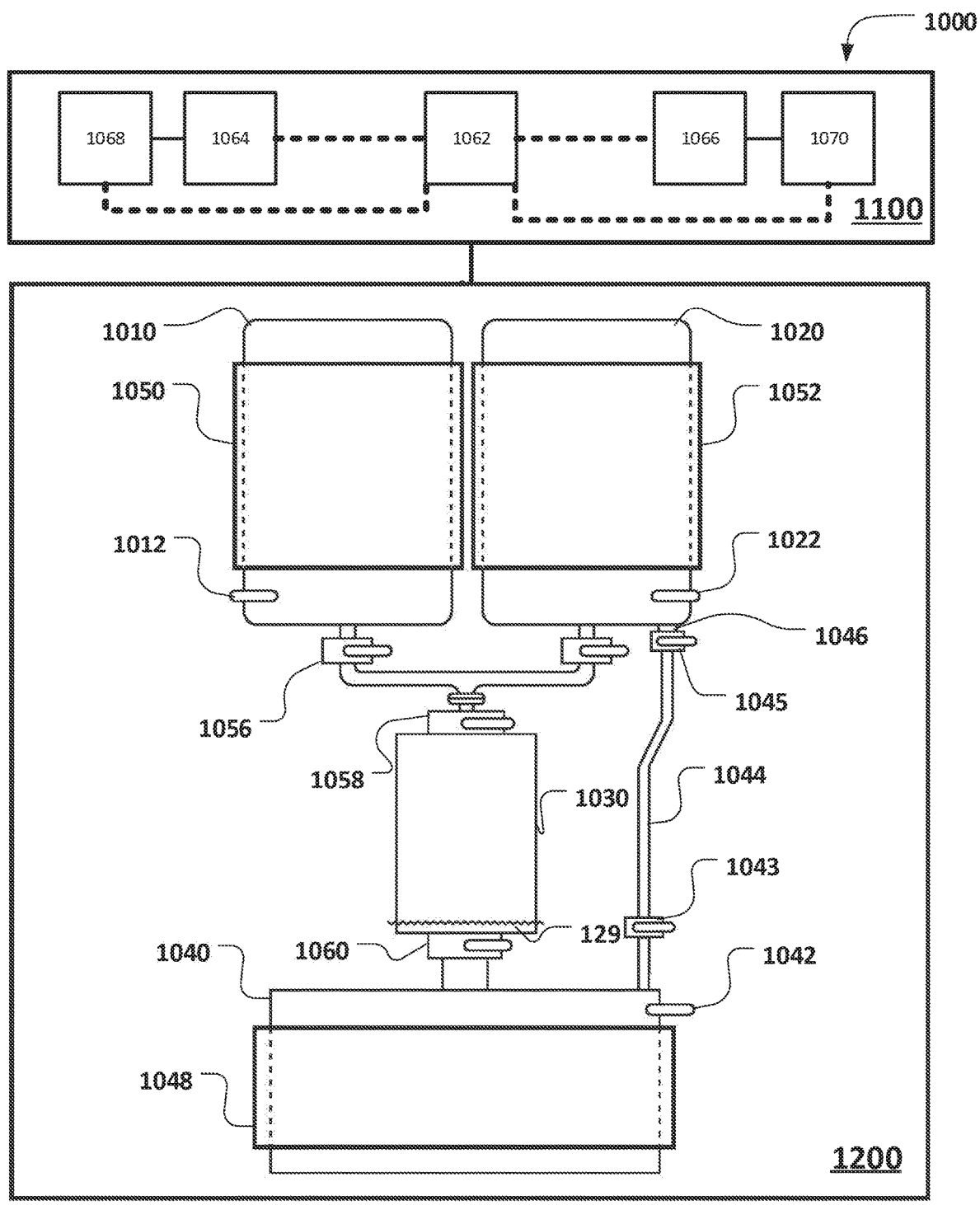
FIG. 10 shows an automated extraction system.

In one embodiment and as generally shown in FIG. 10, the operation of the heating/chilling jackets 915, 945 can be accomplished by utilizing two fluid reservoirs, one preferably maintained at a warm temperature such as 110° F. (43.33° C.), +/−10° F., for example, and the other maintained at a colder temperature such as 35° F. (1.66° C.), +/−3° F., for example. Each jacket 915, 945 couples to circulation pumps—each running a "to" line and "from" line between each reservoir and jacket 915, 945. During the extraction process, the automated control board 960 turns on the warm fluid reservoir pump for the heating/chilling jacket 915 for the first tank 910 circulating the warm fluid through the jacket 915 and back into the reservoir to be reheated and/or turn on the cold fluid pump for the heating/chilling jacket 945 for the second tank 940 circulating the cold fluid into the jacket 945 and back to the cold fluid reservoir to be re-chilled. The pumps circulate the proper temperature fluid to the proper jackets for the proper tanks to execute the extraction process. When the performing the extraction process, the automated control board 960 shuts off the fluid pumps used for extraction and turn on the opposite pumps, the cold fluid pump for the jacket 915 for the first tank 910 and/or the warm fluid pump for the jacket 945 for the second tank 940. When the recapture process is completed, the automatic control board 960 would turn off the fluid pumps. Utilizing the automated control board, the circle of the extraction process and the recapture process is automated. Preferred fluids for the jackets include water and anti-freezes (for example, ethylene glycol).

As shown by FIG. 10, extraction system 1000 includes subsystems 1100 and 1200. Subsystem 1100 includes controller 1062, warm fluid reservoir 1064, cool fluid reservoir 1066, and pumps 1068 and 1070. Subsystem 1100 is operably connected to subsystem 1200 via at least a fluid coupling to one or more thermal elements such as fluid jackets 1050 and 1052. In some embodiments, thermal element 1048 may be a fluid jacket or an electrical heater.

The tanks 1010, 1020, can be made of any number of tanks, in this figure just a first tank 1010 and second tank 1020 are shown, but there is no limit to the size or number of tanks that can be used. As previously discussed, the tanks 1010,1020 may have at least five times the volume as organic material chamber 10100. For example, if the tanks 1010, 1020 have a ten-gallon volume, then the chamber has a two-gallon volume.

In one preferable operation, heat is applied to the first tank 1010 and/or cooling second tanks 1020, to create additional pressure and to reduce the time required to move the entire amount of solvent (solvent can be transported without heating/cooling the tanks 1010, 1020, but the process requires more time). The amount of time depends on the volume of solvent used. Further, cooling a collection tank 1040 creates a vacuum that pulls the solvent through column 1030 and into the collection tank 1040.

However, collection tank 1040 may only be heated by thermal element 1048. In some embodiments, tank 1010 may be in fluid communication with tank 1020 via return line 1044, collection tank 1048, and column 1030. Thus, tank 320 can be cooled to establish a vacuum for drawing solvent from tank 1010 to column 1030.

Recapture is accomplished in manners substantially similar to those discussed above in reference to the embodiment of FIG. 1. In this instance, the heat needs to be added to tank 1040 and cold temperatures added to, for example, tank 1020. Return line 1044 may be coupled to a check valve 1046 for preventing condensed, liquid solvent from falling back into line 1044 and tank 1040. Optional pressure release valves 1012, 1022 and 1042 are located on each of the collection tank 1040 and tanks 1010, 1020. Further valves include valves 1043, 1045, 1054, 1056, 1058, and 1060.

Though the invention has been described with respect to specific preferred embodiments, many variations and modifications will become apparent to those skilled in the art upon reading the present application. Specifically, the invention may be altered in ways readily apparent to those of ordinary skill in the art upon reading the present disclosure. It is therefore the intention that the appended claims and their equivalents be interpreted as broadly as possible in view of the prior art to include all such variations and modifications.

What is claimed is:

1. An extraction system for extracting compounds from an oil-bearing plant material, the extraction system comprising:
    a first tank adapted to store a solvent and defining a solvent outlet for providing a liquid solvent;

a second tank defining a solvent-oil mixture inlet that is arranged for receiving a solvent-oil mixture from an extraction column;

the extraction column defining a hollow expanse that is adapted to hold the oil-bearing plant material, wherein the extraction column further defines a fluid inlet operably coupled with the solvent outlet and a fluid outlet operably coupled with the solvent-oil mixture inlet;

a first fluid jacket in thermal communication with the first tank;

a second fluid jacket in thermal communication with the second tank;

a warm fluid reservoir arranged in selective fluid communication with the first and second fluid jackets for at least one of evaporating the solvent from the solvent oil mixture and transporting the solvent; and a cool fluid reservoir arranged in selective fluid communication with the first and second fluid jackets for at least one of condensing the solvent and transporting the solvent.

2. The system of claim 1, with the extraction column arranged completely within a footprint of the second tank.

3. The system of claim 1, with the extraction column arranged above the second tank such that the fluid outlet is arranged directly above the solvent-oil mixture inlet.

4. The system of claim 3, with the first tank arranged above the extraction column such that the solvent outlet is arranged directly above the fluid inlet, the fluid outlet, and the first solvent-oil mixture inlet.

5. The system of claim 1, with the system further comprising at least a first valve arranged downstream of the extraction column and upstream of the second tank for selective fluid coupling of the extraction column with the second tank.

6. The system of claim 5, with the second tank comprising a first mechanical coupling feature, the extraction column comprising a second mechanical coupling feature, the extraction column arranged above the second tank such that the fluid outlet is arranged above the solvent-oil mixture inlet, the second tank mechanically supporting the extraction column via a direct or indirect mechanical coupling of the first and second mechanical coupling features, and the at least first valve mechanically coupled to at least one of the first and second mechanical coupling features.

7. The system of claim 6, with the at least first valve mechanically coupled to both the first and second mechanical coupling features and thereby the second tank is indirectly mechanically coupled to the extraction column via the at least first valve.

8. The system of claim 6, with the first tank arranged above the extraction column such that the second tank mechanically supports the first tank and the extraction column.

9. The system of claim 6, with the first mechanical coupling feature being a first threading and the second mechanical coupling feature being a second threading adapted to mechanically couple with the first threading, thereby mechanically and fluidly coupling the extraction column with the second tank via the direct mechanical coupling.

10. The system of claim 1, with the system further comprising a first pump operably connected to the warm fluid reservoir and arranged in selective fluid communication with the first and second fluid jackets and a second pump operably connected to the cool fluid reservoir and arranged in selective fluid communication with the first and second fluid jackets.

11. The system of claim 1, with the first tank defining a vapor-phase solvent inlet arranged for receiving vapor-phase solvent and the second tank defining a vapor-phase solvent outlet arranged for transporting the vapor-phase solvent outside the second tank.

12. The system of claim 11, with the system further comprising a recapture line arranged to provide a fluid pathway between the vapor-phase solvent inlet and the vapor-phase solvent outlet.

13. The system of claim 12, with the first fluid jacket arranged to at least cool the first tank for condensing the vapor-phase solvent and assist in transporting the vapor-phase solvent from the second tank to the first tank.

14. The system of claim 13, with the first tank arranged to be the first condensing element that the vapor-phase solvent reaches after being transported through the fluid pathway.

15. The system of claim 13, with the first tank being the only condensing element of the system.

16. The system of claim 1 with the system further comprising a third tank arranged in selective fluid communication with the second tank and the extraction column, the third tank adapted to store the solvent and defining a second solvent outlet for providing the liquid solvent and a vapor-phase solvent inlet arranged for receiving vapor phase solvent.

17. The system of claim 16 with the system further comprising a third fluid jacket in thermal communication with the third tank.

18. The system of claim 17, with at least one of the warm fluid reservoir and the cool fluid reservoir further arranged in selective fluid communication with the third fluid jacket.

19. The system of claim 18, with the third tank arranged to be the first condensing element that the vapor-phase solvent reaches after being transported outside the second tank.

20. The system of claim 1 with the first tank having a volume of at least four times the volume of the extraction column.

21. The system of claim 1 with the second tank comprising an interior height to width ratio of at least 1:3.

22. The system of claim 1 with the second tank comprising a funnel-shaped bottom surface.

23. The system of claim 1 with the second tank defining a drainage aperture arranged on a bottom of the second tank.

24. The system of claim 23 with the system further comprising a drainage pipe coupled to the drainage aperture.

25. The system of claim 24 with the system further comprising a valve operably coupled to the drainage pipe.

26. The system of claim 1, with the first tank arranged above the extraction column such that the solvent outlet is arranged directly above the fluid inlet.

27. The system of claim 1, with the first tank arranged above the extraction column and the extraction column arranged above the second tank such that an axis, which is perpendicular to an aperture defined by at least one of the solvent outlet, the fluid inlet, the fluid outlet, and the solvent-oil mixture inlet, extends through the first tank, the extraction column, and the second tank.

28. An extraction system for extracting compounds from an oil-bearing plant material, the extraction system comprising:

a first tank adapted to store a solvent and defining a solvent outlet for providing a liquid solvent;

a second tank defining a solvent-oil mixture inlet that is arranged for receiving a solvent-oil mixture from an extraction column;

the extraction column defining a hollow expanse that is adapted to hold the oil-bearing plant material, wherein the extraction column further defines a fluid inlet operably coupled with the solvent outlet and a fluid outlet operably coupled with the solvent-oil mixture inlet;

a first fluid jacket in thermal communication with the first tank;

a second fluid jacket in thermal communication with the second tank;

a warm fluid reservoir arranged in selective fluid communication with the first and second fluid jackets for at least evaporating, in the second tank, the solvent from the solvent-oil mixture and transporting, from the second tank, vapor-phase solvent; and a cool fluid reservoir arranged in selective fluid communication with the first and second fluid jackets for at least condensing, in the first tank, the vapor-phase solvent and for transporting, from the first tank, the liquid solvent.

29. The system of claim 28, with the warm fluid reservoir arranged in selective fluid communication with the first and second fluid jackets for at least evaporating, in the second tank, the solvent from the solvent-oil mixture, transporting, from the second tank, vapor-phase solvent, and transporting, from the first tank, the liquid solvent.

30. The system of claim 28, with the first tank having a volume of at least four times the volume of the extraction column.

31. The system of claim 28, with the second tank having a height-to-width ratio of at least 1:3.

32. The system of claim 28, further comprising:
    a third tank arranged in selective fluid communication with the second tank and the extraction column, the third tank adapted to store the solvent and defining a second solvent outlet for providing the liquid solvent and a vapor-phase solvent inlet arranged for receiving the vapor-phase solvent; and
    a third fluid jacket in thermal communication with the third tank.

33. The system of claim 32, with the warm fluid reservoir and the cool fluid reservoir further arranged in selective fluid communication with the third fluid jacket.

* * * * *